(12) United States Patent
Pearson et al.

(10) Patent No.: US 12,496,368 B2
(45) Date of Patent: Dec. 16, 2025

(54) LIGHT CONVERSION SYSTEMS, METHODS, AND DEVICES

(71) Applicant: B/E AEROSPACE, INC., Winston Salem, NC (US)

(72) Inventors: Matthew R Pearson, Hartford, CT (US); Brian St. Rock, Andover, CT (US); Eric Johannessen, Holbrook, NY (US)

(73) Assignee: GOODRICH LIGHTING SYSTEMS, INC., Phoenix, AZ (US)

( * ) Notice: Subject to any disclaimer, the term of this patent is extended or adjusted under 35 U.S.C. 154(b) by 1039 days.

(21) Appl. No.: 17/404,720

(22) Filed: Aug. 17, 2021

(65) Prior Publication Data

US 2023/0053560 A1 Feb. 23, 2023

(51) Int. Cl.
*A61L 2/26* (2006.01)
*A61L 2/10* (2006.01)
*F21Y 115/10* (2016.01)

(52) U.S. Cl.
CPC ...... *A61L 2/26* (2013.01); *A61L 2/10* (2013.01); *A61L 2202/11* (2013.01);
(Continued)

(58) Field of Classification Search
CPC ........ G16B 10/00; G16B 40/00; G16B 50/10; B01L 1/00; B01L 3/021; B01L 3/505; B01L 2200/18; B01L 2300/023; B01L 2300/18; B01L 2200/028; B01L 2200/10; B01L 7/52; B64D 13/08; B64D 13/06; B64D 11/00; B64D 2013/0603; B64D 13/00; B64D 2013/0685; C12Q 1/686; C12Q 1/04; C12Q 1/70; H04L 67/12; G01N 1/2205; G01N 1/2247; G01N 1/40; G01N 1/10; G01N 1/2214; G01N 1/2226; G01N 2001/1031; G01N 2001/2217; G01N 2001/2244; G01N 33/497; G01N 33/4975; G01N 1/2273;
(Continued)

(56) References Cited

U.S. PATENT DOCUMENTS 10,307,495 B2 6/2019 Mori et al.
2007/0053188 A1 3/2007 New et al.
(Continued)

FOREIGN PATENT DOCUMENTS

CN 111757568 10/2020

OTHER PUBLICATIONS

European Patent Office, European Office Action dated Mar. 21, 2024 in Application No. 22190813.0.
(Continued)

*Primary Examiner* — Dean Kwak
(74) *Attorney, Agent, or Firm* — SNELL & WILMER L.L.P.

(57) ABSTRACT

A light assembly may comprise: a light array comprising a plurality of light emitting diodes (LEDs), each light emitting diode (LED) configured to emit an electromagnetic radiation having a wavelength, the wavelength of each LED being different, a first LED in the light array configured to emit a first wavelength between 414 nm and 474 nm; and a non-linear optical layer disposed adjacent to the first LED, the nonlinear optical layer configured to output the first wavelength and a second wavelength, the second wavelength being between 207 nm and 237 nm.

7 Claims, 8 Drawing Sheets

(52) U.S. Cl.
CPC ....... *A61L 2202/14* (2013.01); *A61L 2202/25* (2013.01); *F21Y 2115/10* (2016.08)

(58) Field of Classification Search
CPC ......... G01N 2800/26; B64F 5/30; B64F 5/60; A61L 2202/25; A61L 2/24; A61L 2/10; A61L 2202/11; A61L 2202/14; A61L 2/08; A61L 2202/16; A61L 2/202; A61L 2/26; A61L 2/28; A61L 2202/13; A61L 2202/24; A61L 2202/26; A61L 2209/212; A61L 9/015; F21Y 2115/10
See application file for complete search history.

(56) References Cited

U.S. PATENT DOCUMENTS

| | | |
|---|---|---|
| 2014/0105784 A1 | 4/2014 | Smeeton et al. |
| 2019/0030195 A1 | 1/2019 | Hatti et al. |
| 2020/0073199 A1* | 3/2020 | Lin ..................... A61L 2/0047 |
| 2022/0011646 A1* | 1/2022 | Semmlinger ............ G02F 1/37 |

OTHER PUBLICATIONS

European Patent Office, European Partial Search Report dated Jan. 25, 2023 in Application No. 22190813.0.
European Patent Office, European Search Report dated Apr. 25, 2023 in Application No. 22190813.0.

* cited by examiner

LIGHT CONVERSION SYSTEMS, METHODS, AND DEVICES

FIELD

The present disclosure relates generally to sanitization systems and methods and, more particularly, to sanitization systems and method using frequency doubling to generate FAR-UVC for aircrafts.

BACKGROUND

The recent novel-coronavirus (SARS-COV-2) outbreak has negatively impacted the safety and health of many people. Pathogens can be transmitted via direct airborne transmission between users or via indirect contact transmission from different users occupying the same space at different times. For example, lingering pathogens may remain on contact surfaces of an aircraft cabin to be spread to passengers and/or crew members on a subsequent flight. The safety of passengers and crew members may be improved by performing disinfecting treatments to surfaces, such as seats, ceiling/wall panels, handles, and lavatory surfaces, etc., to mitigate the presence of pathogens on such surfaces. However, conventional disinfection procedures between flights may take time and may thus adversely affect the operating efficiency of the aircraft (increased interval time between flights), and the effectiveness and quality of such conventional treatments are often difficult to verify/track.

SUMMARY

A light assembly is disclosed herein. The light assembly may comprise: a light array comprising a plurality of light emitting diodes (LEDs), each light emitting diode (LED) configured to emit an electromagnetic radiation having a wavelength, the wavelength of each LED being different, a first LED in the light array configured to emit a first wavelength between 414 nm and 474 nm; and a non-linear optical layer disposed adjacent to the first LED, the nonlinear optical layer configured to output the first wavelength and a second wavelength, the second wavelength being between 207 nm and 237 nm.

In various embodiments, the non-linear optical layer is disposed adjacent to each LED in the light array. The non-linear optical layer may be a lens. The nonlinear optical layer may only be disposed adjacent to a first LED. The plurality of LEDs may further comprise a second LED configured to emit a third wavelength. The second wavelength may be in accordance with the first wavelength, and only the first LED is in optical communication with the nonlinear optical layer. The light assembly may further comprise a lens, wherein a portion of the lens includes the non-linear optical layer.

A sanitization system is disclosed herein. The sanitization system may comprise: a passenger service unit including a light assembly, the light assembly comprising: a first light emitting diode (LED) configured to emit a first electromagnetic radiation having a first wavelength; a second LED configured to emit a second electromagnetic radiation having a second wavelength; and a third LED configured to emit a third electromagnetic radiation having a third wavelength between 414 nanometers (nm) and 474 nm, the first wavelength and the second wavelength different from the third? wavelength, the third LED in optical communication with a nonlinear optical layer, the nonlinear optical layer configured to output a portion of the third electromagnetic radiation as a fourth wavelength between 207 nm and 237 nm.

In various embodiments, the first wavelength is between 600 nanometers ("nm") and 740 nm. In various embodiments, the second wavelength is between 500 nm and 565 nm. The nonlinear optical layer may be disposed adjacent to the first LED, the second LED, and the third LED. The sanitization system may further comprise a fourth LED configured to emit a fourth electromagnetic radiation having a fifth wavelength, the fifth wavelength in accordance with the third wavelength. The nonlinear optical layer may only be disposed adjacent to the third LED. The third LED may be operable independent of the first LED, the second LED and the fourth LED, and wherein first LED, the second LED, and the fourth LED may be configured to generate blended light independent of the fourth LED.

A method of retrofitting a first light assembly with a second light assembly having a sanitization system is disclosed herein. The method may comprise: decoupling a lens from the first light assembly in a passenger service unit (PSU); installing a second lens in the PSU to form the second light assembly, the second lens including a non-linear optical layer.

In various embodiments, the non-linear optical layer is an entirety of the second lens. The method may further comprise reconfiguring an intensity output of each light emitting diode (LED) in an array of LEDs based on the non-linear optical layer. The non-linear optical layer may be only a portion of the second lens. The method may further comprise reconfiguring an intensity output of a light emitting diode (LED) in an array of LEDs of the second light assembly based on the non-linear optical layer. The second light assembly may comprise a light emitting diode (LED) configured to emit a third electromagnetic radiation having a third wavelength between 414 nanometers (nm) and 474 nm.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

In various embodiments, Far-UV (222 nm wavelength light) has promise to work in occupied spaces but may utilize significant power to disinfect an entirety of a cabin. Additionally, Far-UV (222 nm wavelength light) may have limitations as to total dosage a human may receive. In various embodiments, integrating Far-UV (222 nm wavelength light) via excimer lamps would be relatively expensive and utilize heavy high-power intensity light sources, such as excimer lamps. Excimer lamps utilize a high voltage supply and have a large gas discharge. In various embodiments, the systems and methods disclosed herein are configured to generate a first light with a first wavelength, convert a portion of the first light to a second light with a second wavelength, the second wavelength being half the first wavelength, and/or maintain a portion of the first light as an indicator. In various embodiments, the first wavelength is between 414 nm and 474 nm, or between 429 nm and 459 nm, or approximately 444 nm.

In various embodiments, a sanitization system disclosed herein comprises a light array. The light array may include a red-green-blue light array, a red-green-blue-white light array or the like. The light array may comprise a plurality of light emitting diodes ("LEDs"). In various embodiments, the sanitization system further comprises a non-linear optical layer. In this regard, a portion of light emitted from a light in the plurality of lights may be converted (e.g., via second harmonic generation) from a blue light (e.g., approximately 444 nm wavelength light) to a far UV light (e.g., 222 nm wavelength light).

Figure 1:
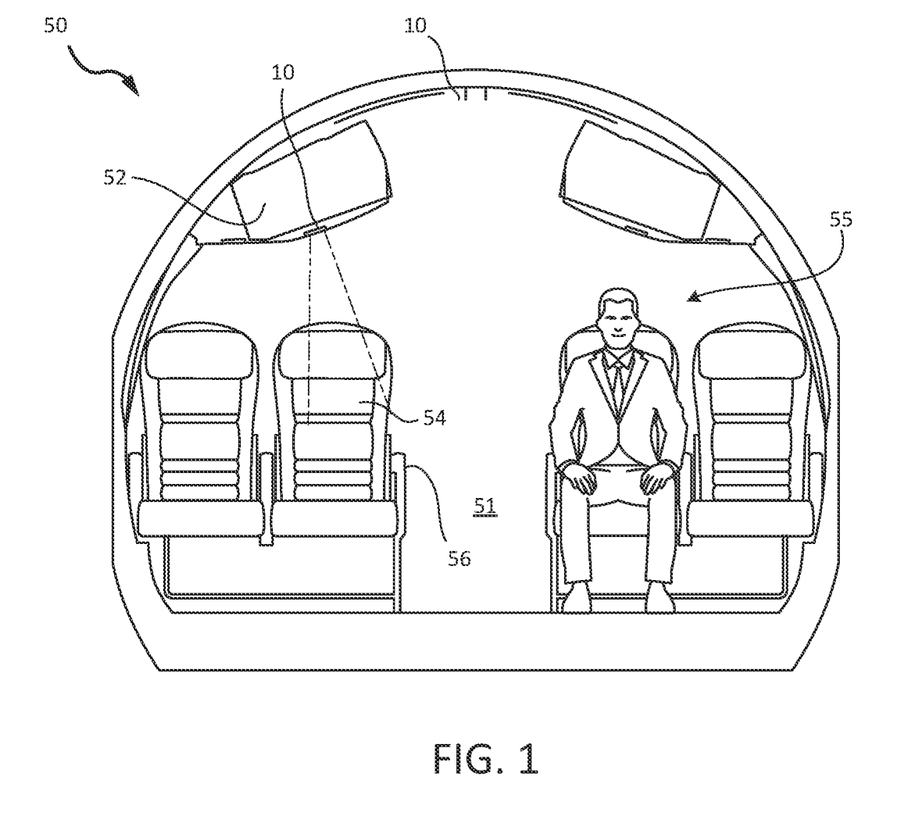
FIG. 1 illustrates a view of a cabin of an aircraft, in accordance with various embodiments.

With reference to FIG. 1, a cabin 51 of an aircraft 50 is shown, according to various embodiments. The aircraft 50 may be any aircraft such as an airplane, a helicopter, or any other aircraft. The aircraft 50 may include various lighting systems 10 that emit visible light to the cabin 51. Pathogens, such as viruses and bacteria, may remain on surfaces of the cabin 51, and these remaining pathogens may result in indirect contact transmission to other people (e.g., subsequent passengers). For example, the cabin 51 may include overhead bins 52, passenger seats 54 for supporting passengers 55, handles 56, lavatory surfaces, and other structures/surfaces upon which active pathogens may temporarily reside. As will be discussed further below, in order to reduce the transmission/transfer of pathogens between passengers, one or more of the lighting systems 10 may blend disinfecting electromagnetic radiation output into the visible light in order to facilitate disinfection of the cabin 51 (e.g., during flights and/or between flights). The lighting systems 10 may be broken down into different addressable lighting regions that could be used on an aircraft. For example, the regions on an aircraft may include sidewall lighting, cross-bin lighting, over wing exit lighting, ceiling lighting, direct lighting, flex lights, reading lights, dome lights, lavatory lights, mirror lights, cockpit lights, cargo lights, etc. The regional breakdown of the lighting system allows lighting control over broad areas of the aircraft. In various embodiments, lighting system 10 may be disposed in/incorporated by a passenger service unit (PSU) for a row of seats. As such, a lighting system 10 could be provided for each row of an aircraft, as well as for each section of different sections of a given row of an aircraft.

Figure 2:
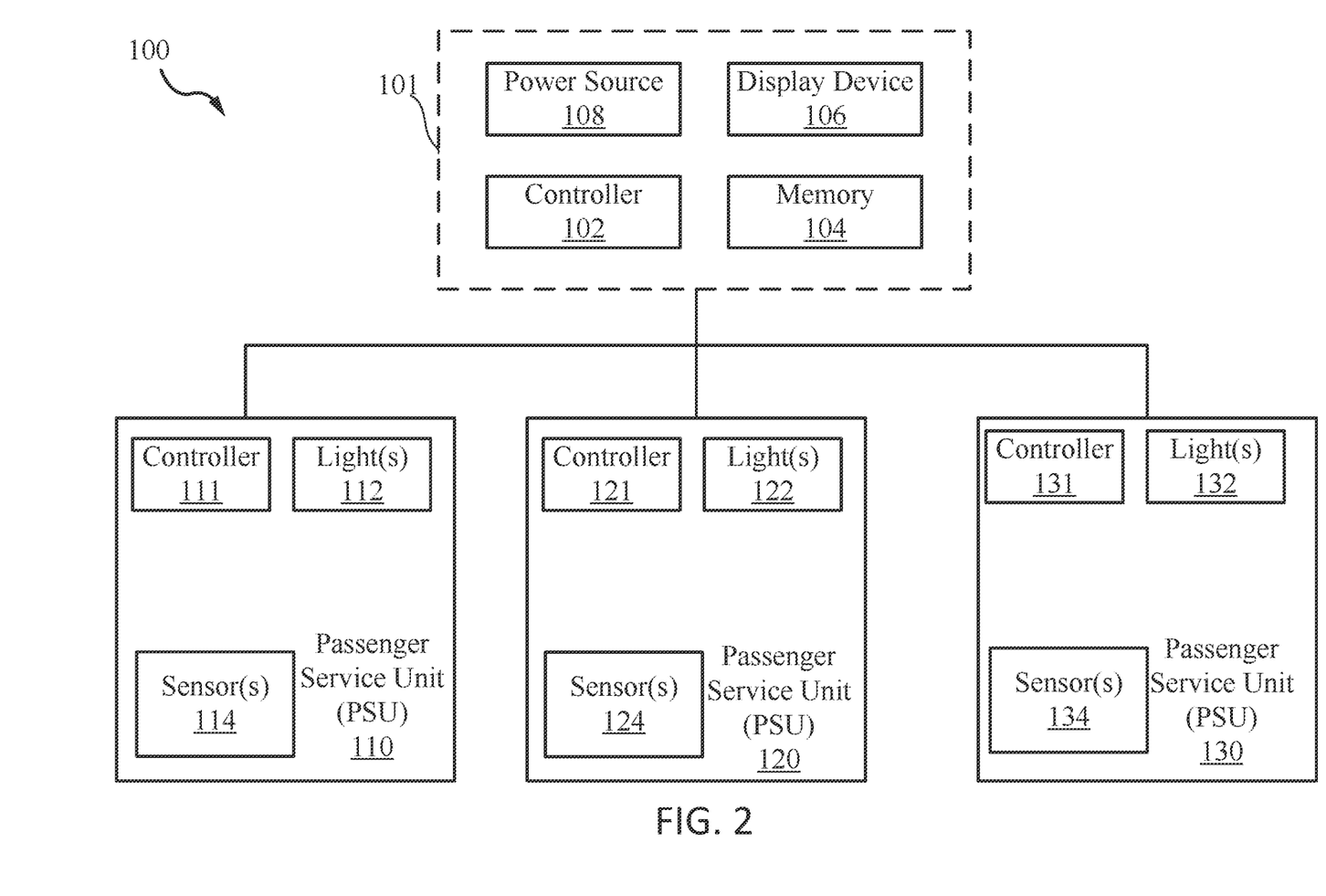
FIG. 2 illustrates a schematic view of a sanitization system, in accordance with various embodiments.

Referring now to FIG. 2 a schematic view of a sanitization system 100 for an aircraft cabin, is illustrated, in accordance with various embodiments. In various embodiments, the sanitization system 100 comprises a main control system 101 and a plurality of PSUs (e.g., first PSU 110, second PSU 120, third PSU 130, etc.). Although illustrated as including three PSUs, the number of PSUs of a sanitization system 100 is not limited in this regard. For example, a PSU may be disposed in each row of seats disposed in a respective column of an aircraft cabin. For example, a cabin with 50 rows and 3 columns may have 150 PSUs (e.g., each row in each column having a PSU). In various embodiments, the PSUs are not limited to rows in the aircraft cabin and may be placed throughout the aircraft cabin as well. For example, PSUs, in accordance with the present disclosure, may be disposed in the lavatory, aisles, cockpit, or any other area of an aircraft cabin where it may be desirable to have sanitization.

In various embodiments, the main control system 101 includes a controller 102 and a memory 104 (e.g., a database or any appropriate data structure; hereafter "memory 104" also may be referred to as "database 104"). The controller 102 may include one or more logic devices such as one or more of a central processing unit (CPU), an accelerated processing unit (APU), a digital signal processor (DSP), a field programmable gate array (FPGA), an application specific integrated circuit (ASIC), or the like (e.g., controller 102 may utilize one or more processors of any appropriate type/configuration, may utilize any appropriate processing architecture, or both). In various embodiments, the controller 102 may further include any non-transitory memory known in the art. The memory 104 may store instructions usable by the logic device to perform operations. Any appropriate computer-readable type/configuration may be utilized as the memory 104, any appropriate data storage architecture may be utilized by the memory 104, or both.

The database 104 may be integral to the control system 101 or may be located remote from the control system 101.

The controller 102 may communicate with the database 104 via any wired or wireless protocol. In that regard, the controller 102 may access data stored in the database 104. In various embodiments, the controller 102 may be integrated into computer systems onboard an aircraft. Furthermore, any number of conventional techniques for electronics configuration, signal processing and/or control, data processing and the like may be employed. Also, the processes, functions, and instructions may include software routines in conjunction with processors, etc.

System program instructions and/or controller instructions may be loaded onto a non-transitory, tangible computer-readable medium having instructions stored thereon that, in response to execution by the processor, cause the controller 102 to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found in In Re Nuijten to fall outside the scope of patentable subject matter under 35 U.S.C. § 101.

The instructions stored on the memory 104 of the controller 102 may be configured to perform various operations, such as performing cleaning schedules between flights, cleaning a specific row in response to a trigger (i.e., a sneeze or the like), etc.

In various embodiments, the main control system 101 from FIG. 2 further comprises a power source 108 and a display device 106. The power source 108 may comprise any power source known in the art, such as a battery, a solar source, an alternating current (AC) source, a rechargeable source, or the like. In various embodiments, the display device 106 may be configured to provide inputs into the control system 101 and alternate between various modes (e.g., alternating from an in-flight mode to a post-flight mode or the like). In various embodiments, the sanitization system 100 may alternate modes automatically in response to detecting a change in mode is desired, as described further herein.

In various embodiments, the main control system 101 is in operable communication with each PSU in the plurality of PSUs (e.g., PSUs 110, 120, 130). In various embodiments, each PSU comprises a local controller (e.g., controllers 111, 121, 131). Each local controller (e.g., controllers 111, 121, 131) may be in accordance with main controller 102). For example, each local controller (e.g., controllers 111, 121, 131) may include one or more logic devices such as one or more of a central processing unit (CPU), an accelerated processing unit (APU), a digital signal processor (DSP), a field programmable gate array (FPGA), an application specific integrated circuit (ASIC), or the like (e.g., controllers 111, 121, 131 may utilize one or more processors of any appropriate type/configuration, may utilize any appropriate processing architecture, or both). In various embodiments, the controllers 111, 121, 131 may each further include any non-transitory memory known in the art. The memory may store instructions usable by the logic device to perform operations. Any appropriate computer-readable type/configuration may be utilized as the memory, any appropriate data storage architecture may be utilized by the memory, or both.

In various embodiments, each PSU (e.g., PSUs 110, 120, 130) may comprise light(s) (e.g., light(s) 112, 122, 132), and/or sensor(s) (e.g., sensors 114, 124, 134), and a local energy storage device (e.g., energy storage 115, 125, 135). In various embodiments, the light(s) 112, 122, 132 may be integrated with a sanitization system. In this regard, the light(s) 112, 122, 132 may be configured to act as reading lights for passengers and sanitization systems simultaneously or independently. As described further herein, the controller 102 may command the various local controllers (e.g., controllers 111, 121, 131) to instruct the devices therein. In various embodiments, the local energy storage device (e.g., energy storage 115, 125, 135) may comprise any electrical storage device, such as a capacitor, a supercapacitor, a superconducting magnetic storage, or the like.

In various embodiments, the power source 108 is sized and configured to power all of the lights (e.g., light(s) 112, 122, 132, etc.) of all of the PSUs (e.g., PSUs 110, 120, 130, etc.) of a sanitization system 100. Since the sanitization system is disposed within the light(s) 112, 122, 132 and utilize a light source having a wavelength between 414 nm and 474 nm, significantly less power may be utilized during a sanitization process as disclosed further herein. In this regard, the power source 108 may be kept similar to a typical power source 108 for an aircraft cabin control system, in accordance with various embodiments.

In various embodiments, there may be a single sensor or a plurality of sensors for each PSU. For example, sensor(s) (e.g., sensor(s) 114, 124, 134) may each include a microphone array, an occupancy sensor, a manual trigger, or a combination thereof. In this regard, the sanitization system 100 may be configured to detect occupancy and/or configured to detect an event where cleaning may be desired, such as a detecting a sneeze, a cough, or the like.

In various embodiments, a respective local controller may be configured to monitor the health of a respective sanitization system of a respective light (e.g., lights 112, 122, 132), as well as a life of a respective light. For example, controller 111 may be configured to receive light source life data from the light(s) 112, 122, 132 of each PSU (e.g., PSUs 110, 120, 130) and may be configured to track a total dosage of FAR-UV supplied to a given area. For example, the controller 111 of PSU 110 may receive a duration that sanitization system of light 112 has been in operation and limit operation when a threshold dosage is being approached, or rely on other lights in a light array of light 112 in response to the threshold dosage being approached.

Figure 3A:
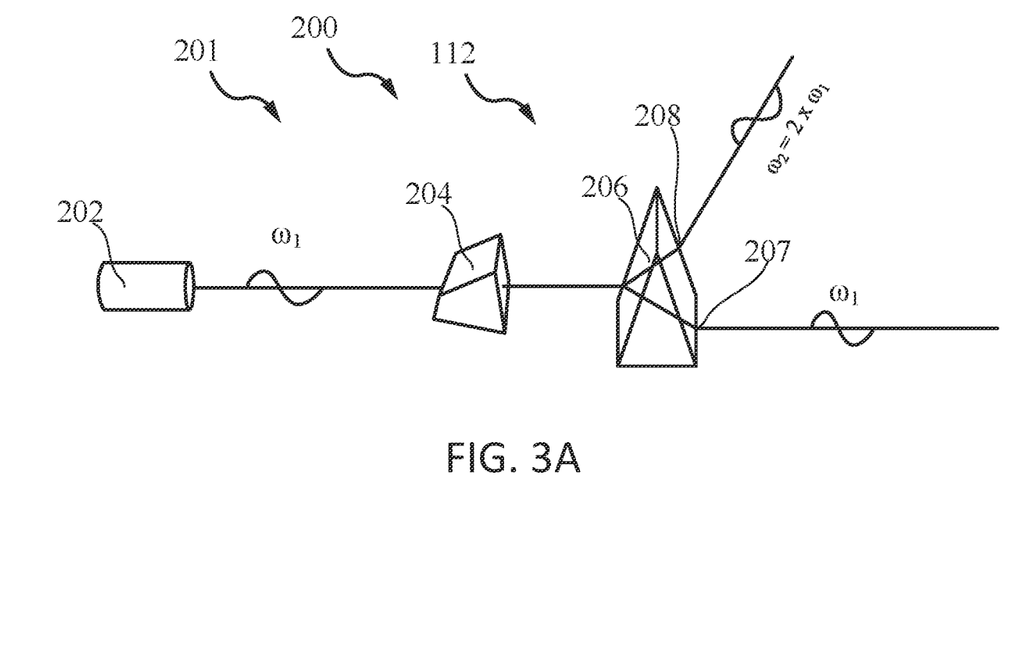
FIG. 3A illustrates a schematic view of a portion of a light assembly, in accordance with various embodiments.

Referring now to FIG. 3A, a schematic view of a portion of a light assembly 200 in accordance with light 112 from FIG. 2, in accordance with various embodiments. The light assembly 200 includes a sanitization system 201. In various embodiments, the light assembly 200 comprises a light source 202. In various embodiments, the light source 202 may comprise a light emitting diode (LED), a Nd:YAG/LBO laser, a InGaN laser diode, an InGaN laser pump source or the like. In various embodiments, any light source capable of generating a light with a first wavelength between 414 nm and 474 nm is within the scope of this disclosure. In various embodiments, the light source may weigh significantly less than a light source capable of generating a UVC wavelength (e.g., between 200 nm and 280 nm). In various embodiments, the light source 202 is in operable communication with a controller (e.g., a local controller 111 from FIG. 1 and/or a main controller 102). In this regard, in response to receiving a signal from a controller, the light source 202 may be activated and generate a wavelength between 414 nm and 474 nm, or between 429 and 459 nm, or approximately 444 nm.

In various embodiments, the light assembly 200 further comprises a nonlinear optical layer 204. The nonlinear optical layer 204 is configured to double a frequency of a portion of an incoming light, in accordance with various embodiments. In various embodiments, the nonlinear optical layer 204 is configured for second harmonic generation (SHG).

In various embodiments, the nonlinear optical layer 204 may comprise any nonlinear crystal configured for frequency doubling, which may include lithium niobate, lithium tantalate, LaBGeO5 (LBGO), potassium niobate, potassium titanyl phosphate, potassium dihydrogen phosphate, potassium dideuterium phosphate, lithium triborate, cesium lithium borate, P-barium borate, bismuth triborate, cesium borate, yttrium calcium oxyborate, strontium beryllium borate, zinc germanium diphosphide, silver gallium sulfide and elenide, gallium selenide, cadmium selenide, or the like. The present disclosure is not limited in this regard.

Figure 3B:
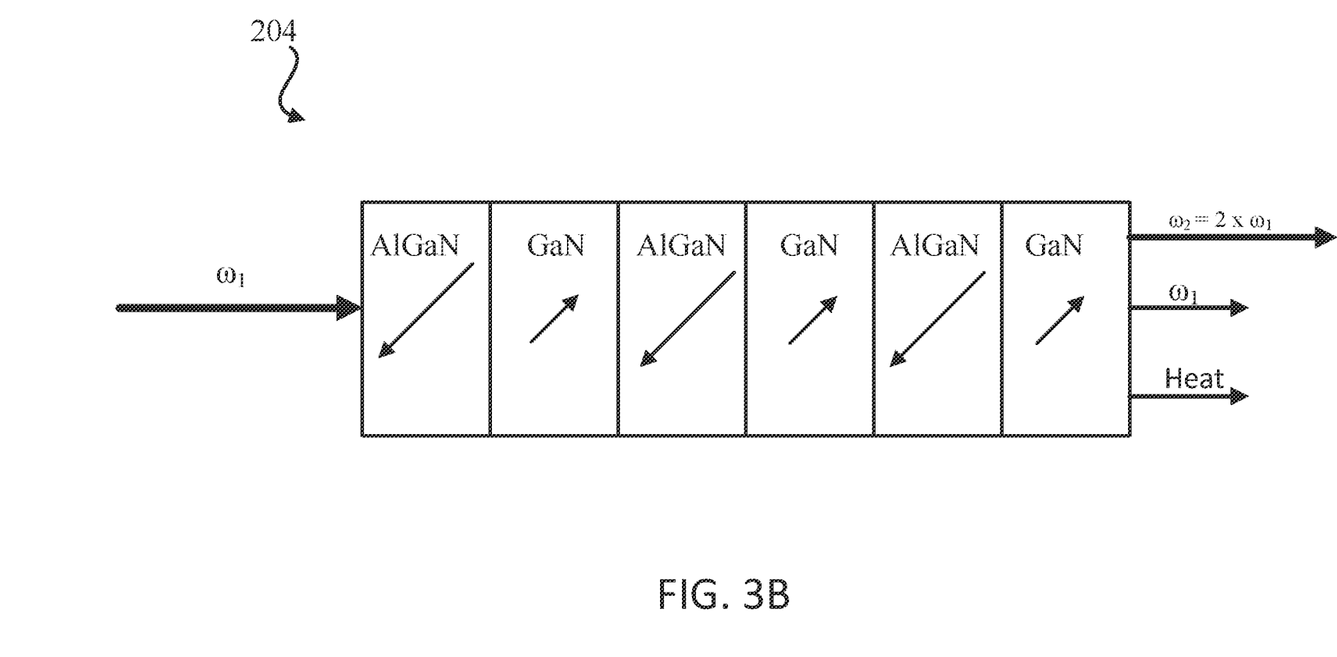
FIG. 3B illustrates a schematic view of a nonlinear converter, in accordance with various embodiments.

With brief reference now to FIG. 3B, a nonlinear optical layer 204 in accordance with various embodiments, is illustrated. The nonlinear optical layer 204 may comprise alternating layers of a first semiconductor and a second semiconductor. For example, the first semiconductor may comprise a regular layer of lithium niobate ($LiNbO_3$) and the second semiconductor may comprise an inversion layer of $LiNbO_3$. The nonlinear optical layer 204 is configured for second harmonic generation. In this regard, two photons of the same frequency interact with the nonlinear optical layer 204, are combined, and generate a new photon with twice the energy of the initial photons individually. In various embodiments, as illustrated light having a first wavelength enters the nonlinear optical layer 204 where nonlinear phase-matching stores energy within the nonlinear optical layer and outputs a second harmonic wave (e.g., $\omega_2 = 2 \times \omega_1$), a residual wave having the same wavelength as the input, and heat. In various embodiments, the second harmonic wave may have less energy relative to the input wave (e.g., between 3% and 10%). In this regard, the nonlinear optical layer 204 may have similar or better efficiency compared to UVC light sources, such as excimer lamps, which have approximately 3% efficiency. Thus, the systems and methods disclosed herein may result in a significantly lighter, portable, and/or less expensive UVC sanitization device, in accordance with various embodiments.

In various embodiments, the output from the nonlinear optical layer 204 is received by a prism 206 configured to direct the light received from the nonlinear optical layer. For example, the first portion of the light with the first wavelength may be directed through first output 207 of the prism 206 and the second portion of the light with the second wavelength may be directed through a second output 208. In various embodiments, the first output and the second output may be collimated (i.e., parallel or the like). In this regard, the first wavelength may indicate to a person that the area is being sanitized as the first wavelength would have greater visibility relative to the second wavelength, in accordance with various embodiments. Although illustrated as being separated, the first wavelength and the second wavelength may be coaxial in accordance with various embodiments. In this regard, the first wavelength may indicate more clearly a location being sanitized, in accordance with various embodiments. Additionally, in various embodiments, the residual light of the first wavelength through first output 207 may be mixed with an additional light source (e.g., light(s) 112 from FIG. 2) to create white light, such as for use as a reading light or the like.

Figures 4A, 4B, 4C:
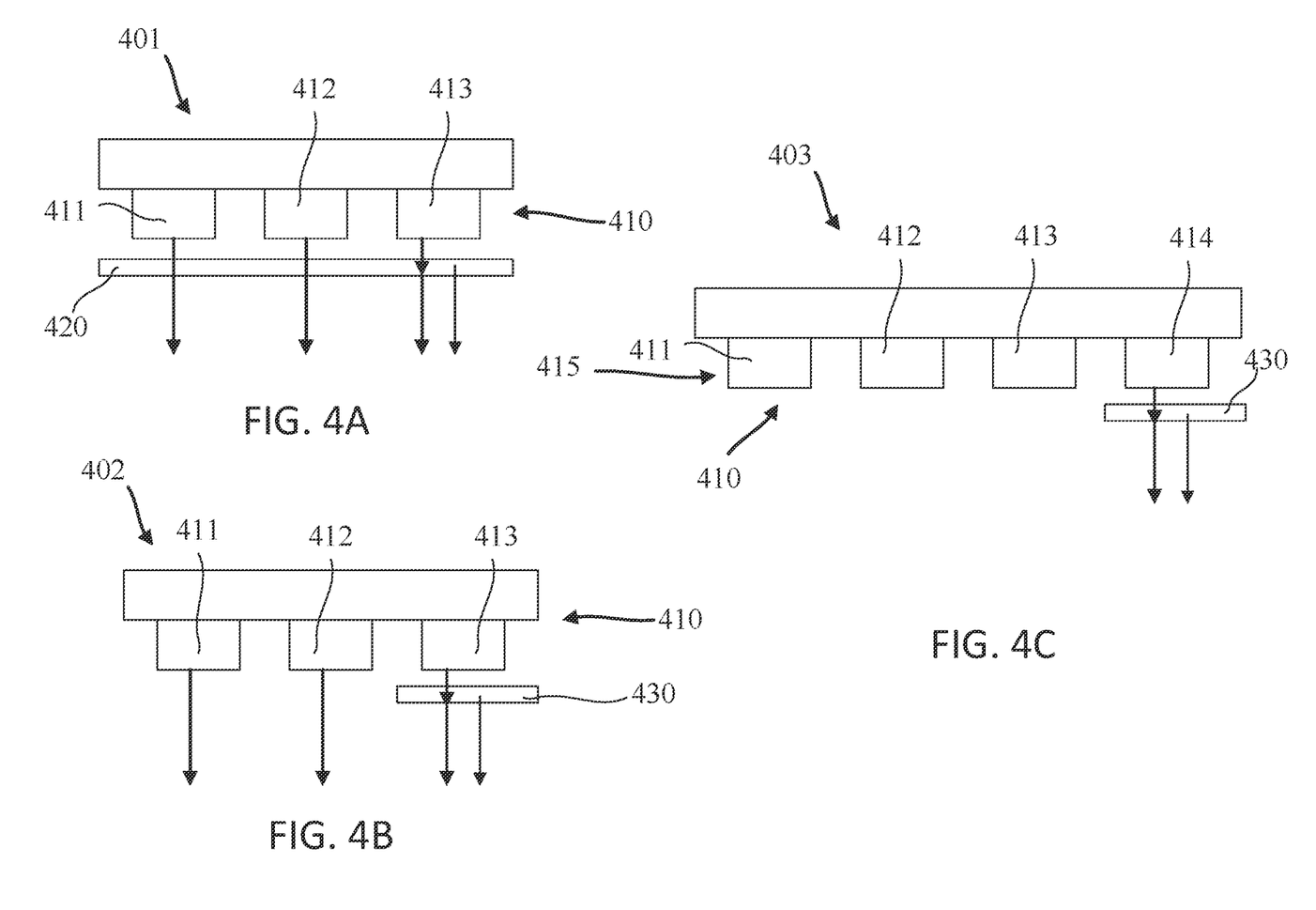
FIG. 4A illustrates a schematic view of a light assembly in accordance with various embodiments.
FIG. 4B illustrates a schematic view of a light assembly in accordance with various embodiments.
FIG. 4C illustrates a schematic view of a light assembly in accordance with various embodiments

Referring now to FIG. 4a, a light assembly 401 is illustrated in accordance with various embodiments. The light assembly 401 is configured for illuminating a portion of a cabin of an aircraft (e.g., as a reading light) and configured as a sanitization system as described further herein. In various embodiments, the light assembly 401 comprises a light array 410. The light array 410 may comprise a first light emitting diode (LED) 411, a second LED 412, and a third LED 413. The first LED may be configured to emit first electromagnetic radiation having a first wavelength of between about 600 nanometers ("nm") and 740 nm (e.g., red light). The second LED 412 is configured to emit second electromagnetic radiation having a second wavelength of between 500 nm and 565 nm (e.g., green light). The third LED 413 is configured to emit a third electromagnetic radiation having a third wavelength between 414 nm and 474 nm.

In various embodiments, the light assembly 401 further comprises a nonlinear optical layer 420 disposed adjacent to the first LED 411, the second LED 412, and the third LED 413. In various embodiments, the nonlinear optical layer 420 is a lens. In this regard, light(s) 112 in a cabin (e.g., reading lights) may replace a typical lens with the nonlinear optical layer 420 to create a light assembly 401 configured for illumination and sanitization as described further herein. In various embodiments, the nonlinear optical layer 420 is in accordance with the nonlinear optical layer 204 from FIG. 3A. In various embodiments, the nonlinear optical layer 420 may be relatively transparent for the first LED 411 and the second LED 412 relative to the third LED 413. In various embodiments, the nonlinear optical layer 420 is configured to convert a portion of the third wavelength to a fourth wavelength between 207 nm and 237 nm in accordance with the sanitization system 201 from FIG. 3A. In various embodiments, a second portion of the third wavelength corresponding to the third wavelength may also be transmitted out the nonlinear optical layer 420. Thus, by increasing an intensity of a light array 410 and combining the light array with a nonlinear optical layer disposed proximate a light output of the light array 410, a light assembly 401 configured for sanitization and typical illumination may be created, in accordance with various embodiments.

Referring now to FIG. 4B, a light assembly 402 is illustrated, in accordance with various embodiments. The light assembly 402 may be in accordance with light assembly 401, except as described herein. In various embodiments, the light assembly 402 includes the light array 410 having the first LED 411, the second LED 412, and the third LED 413. In various embodiments, the light assembly further comprises a nonlinear optical layer 430 disposed adjacent to the third LED 413. In this regard, if a nonlinear optical layer 430 does not contain enough transparency (i.e., having a transmissivity below 90%, or below 95%) for the first wavelength of first LED 411 and the second wavelength of the second LED 412 to provide typical light mixtures, the nonlinear optical layer may be disposed adjacent to the third LED 413 only. In this regard, the third LED may provide the third wavelength for blending the light array 410, as well as providing a fourth wavelength (through second harmonic generation) between 207 nm and 237 nm for sanitization purposes. In various embodiments, the intensity of the third LED may be increased relative to an intensity of the light array 410 without the nonlinear optical layer 430 to provide a similar blending of light as a light array without the nonlinear optical layer 430.

Referring now to FIG. 4C, a light assembly 403 is illustrated, in accordance with various embodiments. The light assembly 403 may comprise a light array 415 comprising the light array 410 and an additional LED light, fourth LED 414. In various embodiments, the fourth LED 414 is in accordance with the third LED 413. In this regard, the fourth LED may be operated independently of the light array 410 and only used during a sanitization process as described herein.

In various embodiments, the light assembly 403 comprises a nonlinear optical layer 430 disposed adjacent to the fourth LED 414. The nonlinear optical layer 430 is in accordance with the nonlinear optical layer 204 from FIG. 3B. In various embodiments, the light assembly 403 may allow typical blending of the light array 410 without interacting with the nonlinear optical layer 204, resulting in lower intensity during operation and less power consumption relative to light assemblies 401, 402. However, light assembly 401 may be more cost effective relative to light assemblies 402, 403 as a single lens may be utilized (e.g., nonlinear optical layer 420) across all LEDs in the light array 410. In contrast, the light assemblies 402, 403 may have an additional lens in adjacent to the first LED 411 and second LED 412 for light assembly 402 and adjacent to the first LED 411, the second LED 412, and the third LED 413 for light assembly 403.

In various embodiments, a lens for light assembly 402, 403 may include a nonlinear optical portion in accordance with nonlinear optical layer 430 and a glass portion, a polycarbonate portion, or the like.

Figure 5:
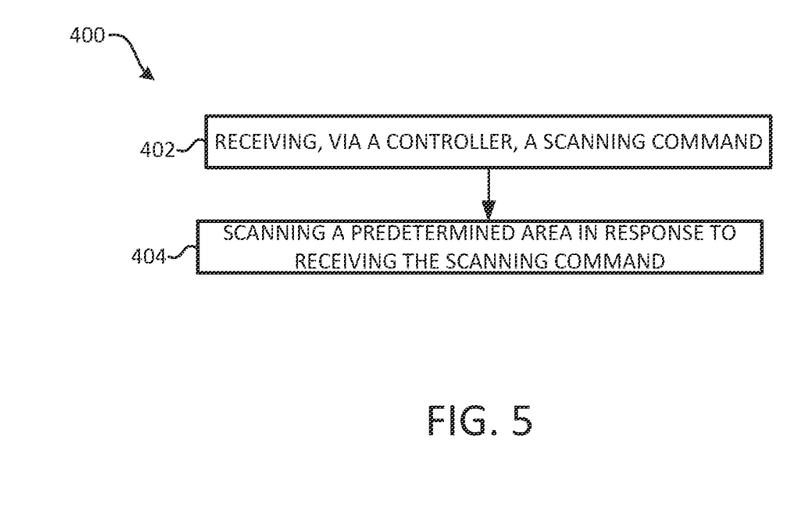
FIG. 5 illustrates a process of operating a light assembly in accordance with various embodiments.

Referring now to FIG. 5, a method of sanitization a portion of an aircraft is illustrated, in accordance with various embodiments. The method may comprise receiving, via a controller, a scanning command (step 402). The scanning command may include a predefined area. In various embodiments, since the output from the prism of 206 of the light assembly 200 is a beam, it can be directed in a manner similar to a barcode scanner or the like. In contrast, excimer lamps, and other far-UV light sources cannot generate a beam or light that can be directed. Thus, the systems and methods disclosed herein may facilitate scanning areas and avoiding people when sanitizing a particular area. In this regard, sensor(s) 114, 124, 134 from FIG. 2 may include infrared sensors, LiDAR sensors, or the like. The sensors may be configured to detect and identify people, and the controller (e.g., main controller 102 or local controllers 111, 121, 131) may be configured to command the light assembly 200 to direct the output beam(s) of the far UV light away from people, in accordance with various embodiments.

The method 400 may further comprise scanning a predetermined area in response to receiving the scanning command (step 404). In various embodiments, the predetermined area may be an area that commonly comes into contact with passengers, such as tray tables, arm rests, or the like. In various embodiments, scanning the predetermined area may be an active scanning where portions of the area are avoided in response to detecting a person as described previously herein. In various embodiments, since the portion of the light that maintains the third wavelength may be directed separately from the fourth wavelength between 207 nm and 237 nm, the sanitization process may avoid individuals during sanitizing, and the respective light assembly may maintain appropriate color blending, in accordance with various embodiments.

Figure 6:
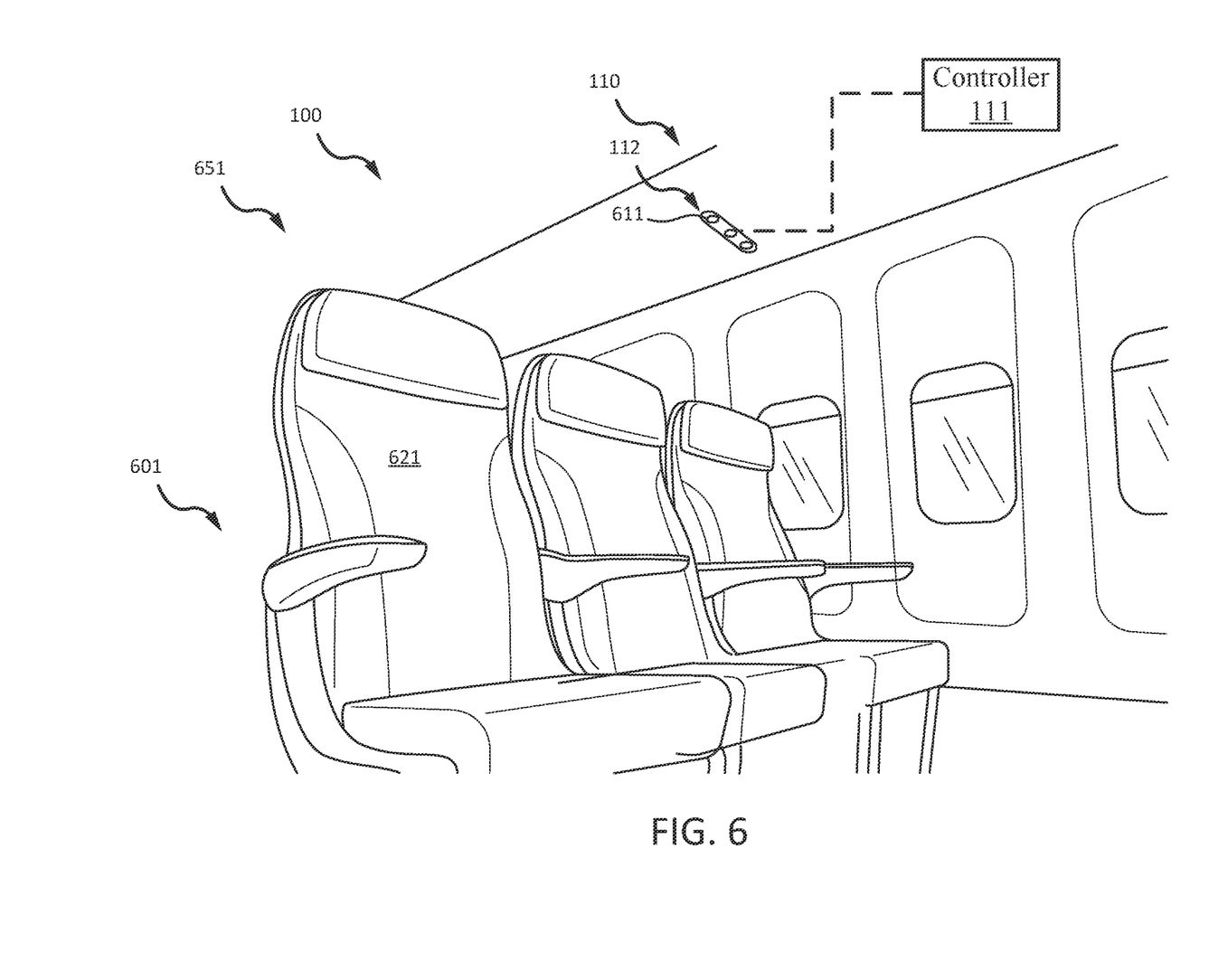
FIG. 6 illustrates a light system for a cabin of an aircraft, in accordance with various embodiments.

Referring now to FIG. 6, a perspective view of a portion of the sanitization system 100 from FIG. 2 is illustrated, in accordance with various embodiments. The sanitization system 100 includes the light(s) 112. In various embodiments, each light(s) 112 may correspond to a seat in a respective row. For example, a first light 611 may be configured to align towards a first seat 621 in a row 601 of in the aircraft cabin 651. In this regard, each light in the light(s) 112 in a PSU 110 may be configured to emit light towards a seat in a row of the respective PSU 110.

In various embodiments, the light(s) 112 may include a sanitization system therein. Thus, disposed within a PSU 110 includes the light source 202, the nonlinear optical layer 204, and the prism 206 from FIG. 2. In various embodiments, the local controller 111 (or main controller 102) from FIG. 2 may adjust a beam direction of a respective light source 202 from FIG. 2 during a sanitization process (e.g., method 400). In various embodiments, the sanitization system 100 may be configured to direct the light away from a passenger's head (e.g., towards the tray tables, or the like).

Figure 7:
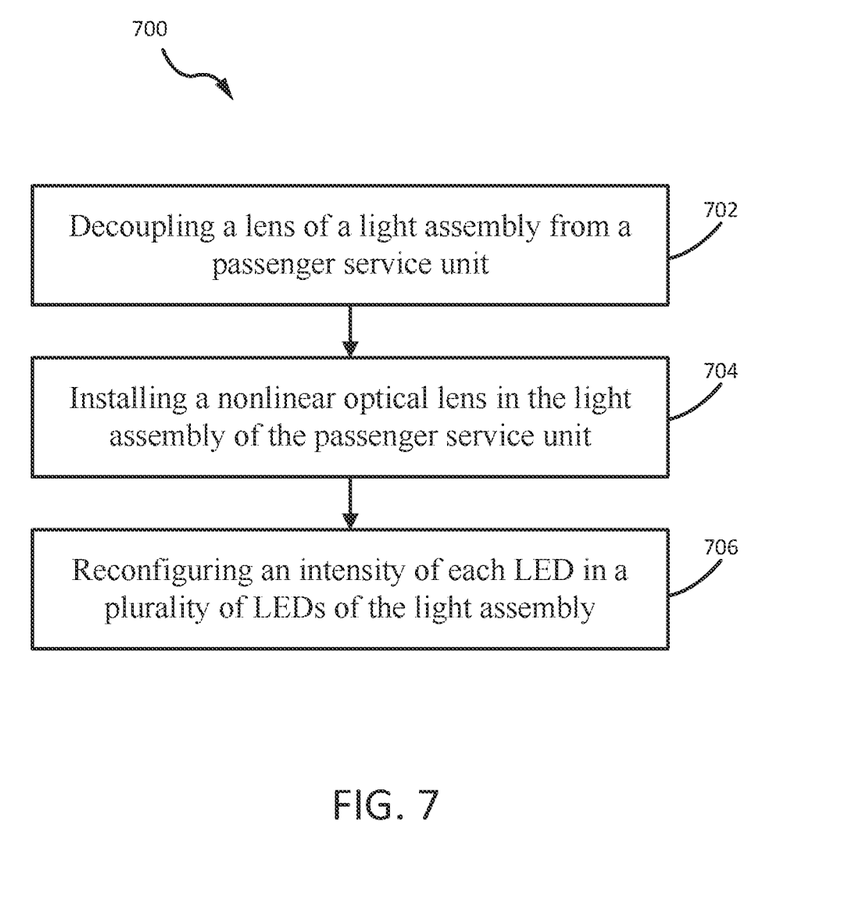
FIG. 7 is a process performed by a control system for a sanitization system, in accordance with various embodiments.

Referring now to FIG. 7, a method of retrofitting a light assembly in a passenger service unit of an aircraft cabin, method 700, is illustrated in accordance with various embodiments. The method 700 comprises decoupling a lens of a light assembly from a passenger service unit (step 702). The method 700 further comprises installing a nonlinear optical lens in the light assembly of the passenger service unit (step 704). In this regard, the light assembly may be in accordance with light assembly 401, in accordance with various embodiments. In various embodiments, the nonlinear optical lens may include a nonlinear portion and a lens portion. In this regard, the light assembly may be in accordance with light assembly 402, in accordance with various embodiments.

In various embodiments, the method 700 further comprises reconfiguring an intensity of an LED in the plurality of LEDs in the light assembly (step 706). In various embodiments, if the light assembly is in accordance with light assembly 401, an intensity of each LED may be reconfigured. In various embodiments, if the light assembly is in accordance with light assembly 402, only the light assembly in optical communication with the nonlinear portion of the lens may be reconfigured.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A sanitization system, comprising:
    a passenger service unit including a light assembly, the light assembly comprising:
    a first light emitting diode (LED) configured to emit a first electromagnetic radiation having a first wavelength toward a seat in a row of a cabin of an aircraft;
    a second LED configured to emit a second electromagnetic radiation having a second wavelength toward the seat in the row of the cabin of the aircraft, the second wavelength being different from the first wavelength;
    a third LED configured to emit a third electromagnetic radiation having a third wavelength toward the seat in the row of the cabin of the aircraft, the third wavelength being between 414 nanometers (nm) and 474 nm, the first wavelength and the second wavelength different from the third wavelength; and
    a nonlinear optical layer, the nonlinear optical layer in optical communication with the third LED, the nonlinear optical layer configured to receive the third electromagnetic radiation from the third LED and output a portion of the third electromagnetic radiation as a fourth wavelength toward the seat in the row of the cabin of the aircraft, the fourth wavelength being between 207 nm and 237 nm, the fourth wavelength being different from the first wavelength, the second wavelength, and the third wavelength.

2. The sanitization system of claim 1, wherein the first wavelength is between 600 nm and 740 nm.

3. The sanitization system of claim 2, wherein the second wavelength is between 500 nm and 565 nm.

4. The sanitization system of claim 1, wherein the nonlinear optical layer is disposed adjacent to the first LED, the second LED, and the third LED.

5. The sanitization system of claim 1, further comprising a fourth LED configured to emit a fourth electromagnetic radiation having a fifth wavelength toward the seat in the row of the cabin of the aircraft, the fifth wavelength in accordance with the third wavelength.

6. The sanitization system of claim 5, wherein the nonlinear optical layer is only disposed adjacent to the third LED.

7. The sanitization system of claim 6, wherein the third LED is operable independent of the first LED, the second LED and the fourth LED, and wherein the first LED, the second LED, and the fourth LED are configured to generate blended light independent of the fourth LED.

* * * * *